United States Patent
Miao et al.

(10) Patent No.: US 10,235,606 B2
(45) Date of Patent: Mar. 19, 2019

(54) METHOD AND SYSTEM FOR CONVOLUTIONAL NEURAL NETWORK REGRESSION BASED 2D/3D IMAGE REGISTRATION

(71) Applicants: Siemens Healthcare GmbH, Erlangen OT (DE); The University of British Columbia, Vancouver (CA)

(72) Inventors: Shun Miao, Princeton, NJ (US); Rui Liao, West Windsor, NJ (US); Zhen Wang, Vancouver (CA)

(73) Assignees: Siemens Healthcare GmbH, Erlangen (DE); The University of British Columbia, Vancouver (CA)

( * ) Notice: Subject to any disclaimer, the term of this patent is extended or adjusted under 35 U.S.C. 154(b) by 331 days.

(21) Appl. No.: 15/207,033

(22) Filed: Jul. 11, 2016

(65) Prior Publication Data

US 2017/0024634 A1 Jan. 26, 2017

Related U.S. Application Data

(60) Provisional application No. 62/195,430, filed on Jul. 22, 2015, provisional application No. 62/215,326, filed on Sep. 8, 2015.

(51) Int. Cl.
*G06K 9/46* (2006.01)
*G06K 9/62* (2006.01)
(Continued)

(52) U.S. Cl.
CPC ......... *G06K 9/6277* (2013.01); *G06K 9/4671* (2013.01); *G06N 3/04* (2013.01);
(Continued)

(58) Field of Classification Search
None
See application file for complete search history.

(56) References Cited

U.S. PATENT DOCUMENTS

| | | | |
|---|---|---|---|
| 2012/0039519 A1* | 2/2012 | Fei | A61B 6/12 382/131 |
| 2018/0061051 A1* | 3/2018 | Matsunaga | G06T 7/62 |
| 2018/0075309 A1* | 3/2018 | Sathyanarayana | G05D 1/0088 |

FOREIGN PATENT DOCUMENTS

WO WO2005024721 A2 3/2005

OTHER PUBLICATIONS

K. Hara and R. Chellappa, "Computationally Efficient Regression on a Dependency Graph for Human Pose Estimation," 2013 IEEE Conference on Computer Vision and Pattern Recognition, Portland, OR, 2013, pp. 3390-3397.doi: 10.1109/CVPR.2013.435 URL: http://ieeexplore.ieee.org/stamp/stamp.jsp?tp=&arnumber=6619279&isnumber=6618844.*

(Continued)

*Primary Examiner* — Tahmina N Ansari (57) ABSTRACT

A method and apparatus for convolutional neural network (CNN) regression based 2D/3D registration of medical images is disclosed. A parameter space zone is determined based on transformation parameters corresponding to a digitally reconstructed radiograph (DRR) generated from the 3D medical image. Local image residual (LIR) features are calculated from local patches of the DRR and the X-ray image based on a set of 3D points in the 3D medical image extracted for the determined parameter space zone. Updated transformation parameters are calculated based on the LIR features using a hierarchical series of regressors trained for the determined parameter space zone. The hierarchical series of regressors includes a plurality of regressors each of which calculates updates for a respective subset of the transformation parameters.

21 Claims, 6 Drawing Sheets

(51) Int. Cl.
  *G06T 7/33*    (2017.01)
  *G06N 3/04*    (2006.01)
  *G06N 3/08*    (2006.01)

(52) U.S. Cl.
  CPC ............ *G06N 3/08* (2013.01); *G06T 7/33* (2017.01); *G06T 2200/04* (2013.01); *G06T 2207/10081* (2013.01); *G06T 2207/10088* (2013.01); *G06T 2207/10116* (2013.01); *G06T 2207/10124* (2013.01); *G06T 2207/20021* (2013.01); *G06T 2207/20081* (2013.01); *G06T 2207/20084* (2013.01); *G06T 2207/30052* (2013.01)

(56) References Cited

OTHER PUBLICATIONS

M. Ozay, K. Walas and A. Leonardis, "A hierarchical approach for joint multi-view object pose estimation and categorization," 2014 IEEE International Conference on Robotics and Automation (ICRA), Hong Kong, 2014, pp. 5480-5487. doi: 10.1109/ICRA.2014.6907665 URL: http://ieeexplore.ieee.org/stamp/stamp.jsp?tp=&arnumber=6907665&isnumber=6906581.*
S. Miao, Z. J. Wang and R. Liao, "A CNN Regression Approach for Real-Time 2D/3D Registration," in IEEE Transactions on Medical Imaging, vol. 35, No. 5, pp. 1352-1363, May 2016. doi: 10.1109/TMI.2016.2521800, URL: http://ieeexplore.ieee.org/stamp/stamp.jsp?tp=&arnumber=7393571&isnumber=7463083.*

* cited by examiner

METHOD AND SYSTEM FOR CONVOLUTIONAL NEURAL NETWORK REGRESSION BASED 2D/3D IMAGE REGISTRATION

This application claims the benefit of U.S. Provisional Application No. 62/195,430, filed Jul. 22, 2015, and U.S. Provisional Application No. 62/215,326, filed Sep. 8, 2015, the disclosures of which are herein incorporated by reference.

BACKGROUND OF THE INVENTION

The present invention relates to two dimensional (2D) to three dimensional (3D) medical image registration, and more particularly, to deep learning based 2D/3D medical image registration.

Two dimensional (2D) to three dimensional (3D) image registration is an important technology in medical imaging and image-guided interventions. 2D/3D image registration can be used to bring pre-operative 3D medical image data and intra-operative 2D medical image data into the same coordinate system to facilitate accurate diagnosis and/or provided advanced image guidance. For example, the pre-operative 3D medical image data generally includes computed tomography (CT), cone-beam CT (CBCT), magnetic resonance imaging (MRI), and/or computer aided design (CAD) models of medical devices, while the intra-operative 2D medical image data is typically X-ray images.

2D/3D image registration is typically achieved using intensity-based methods. In such intensity-based 2D/3D image registration methods, in order to register a 3D X-ray attenuation map provided by CT or CBCT (or converted from another imaging modality), a simulated X-ray image, referred to as a digitally reconstructed radiograph (DRR), is derived from the 3D attenuation map by simulating the attenuation of virtual X-rays. An optimizer is then employed to maximize an intensity-based similarity measure between the DRR and X-ray images. Intensity-based methods are able to achieve high registration accuracy, but suffer drawbacks including long computation time and small capture range. Because intensity-based methods involve a large number of evaluations of the similarity measure, each requiring heavy computation in rendering the DRR, such methods typically result in running times greater than one second, and therefore are not suitable for real-time applications. In addition, because the similarity measures to be optimized in intensity-based methods are often highly non-convex, the optimizer has a high chance of getting trapped into a local maxima, which leads to such methods having a small capture range in which high registration accuracy can be achieved.

BRIEF SUMMARY OF THE INVENTION

The present invention provides a method and system for 2D/3D medical image registration deep learning-based regression. Embodiments of the present invention achieve real-time 2D/3D medical image registration with a large capture range and high accuracy. Embodiments of the present invention train convolutional neural network (CNN) regressors to determine a mapping from a 2D medical image and digitally reconstructed radiograph (DRR) generated from a 3D medical image to the difference of their underlying transformation parameters. Embodiments of the present invention utilize a local image residual (LIR) feature to simplify the underlying mapping to be captured by the CNN regressors Embodiments of the present invention utilize parameter space partitioning (PSP) to partition the transformation parameter space into zones and train CNN regressors in each zone separately. Embodiments of the present invention utilize hierarchical parameter regression (HPR) to decompose the transformation parameters and regress them in a hierarchical manner.

In one embodiment of the present invention, a parameter space zone is determined based on transformation parameters corresponding to a digitally reconstructed radiograph (DRR) generated from the 3D medical image. Local image residual (LIR) features are calculated from local patches of the DRR and the X-ray image based on a set of 3D points in the 3D medical image extracted for the determined parameter space zone. Updated transformation parameters are calculated based on the LIR features using a hierarchical series of regressors trained for the determined parameter space zone. The hierarchical series of regressors includes a plurality of regressors each of which calculates updates for a respective subset of the transformation parameters.

These and other advantages of the invention will be apparent to those of ordinary skill in the art by reference to the following detailed description and the accompanying drawings.

DETAILED DESCRIPTION

The present invention relates to a method and system for 2D/3D medical image registration using deep learning-based regression. Embodiments of the present invention are described herein to give a visual understanding of the 2D/3D medical image registration method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are described herein as registering a 3D X-ray attenuation map provided by a CT or CBCT with a 2D X-ray image in real-time. Depending on the application, other 3D modalities, such as MRI or a CAD model, can be converted to a 3D X-ray attenuation map before performing the 2D/3D registration.

Assuming that the X-ray imaging system corrects the beam divergence and the X-ray sensor has a logarithm static response, X-ray image generation can be described by the following model:

$$I(p)=\int \mu(L(p,r))dr, \quad (1)$$

where I(p) is the intensity of the X-ray image at point p, L(p, r) is the ray from the X-ray source to point p, parameterized by r, and $\mu(\cdot)$ is the X-ray attenuation coefficient. Denoting the X-ray attenuation map of an object to be imaged as J: $\mathbb{R}^3 \to \mathbb{R}$, and the 3D transformation from the object coordinate system to the X-ray imaging coordinate system as T: $\mathbb{R}^3 \to \mathbb{R}^3$, the attenuation coefficient at point x in the X-ray imaging coordinate system is:

$$\mu(x)=J(T^{-1}\circ x). \quad (2)$$

Combining Equation (1) and Equation (2), we have:

$$I(p)=\int J(T^{-1}\circ L(p,r))dr. \quad (3)$$

In 2D/3D registration problems, L is determined by the X-ray imaging system, J is provided by the 3D data (e.g., CT intensity), and the transformation T is to be estimated based on the input X-ray image I. Note that given J, L, and T, a synthetic X-ray image $I(\cdot)$ can be computed following Equation (3) using a well-known Ray-Casting algorithm, and the generated synthetic image is referred to as a digitally reconstructed radiograph (DRR).

Figure 1:
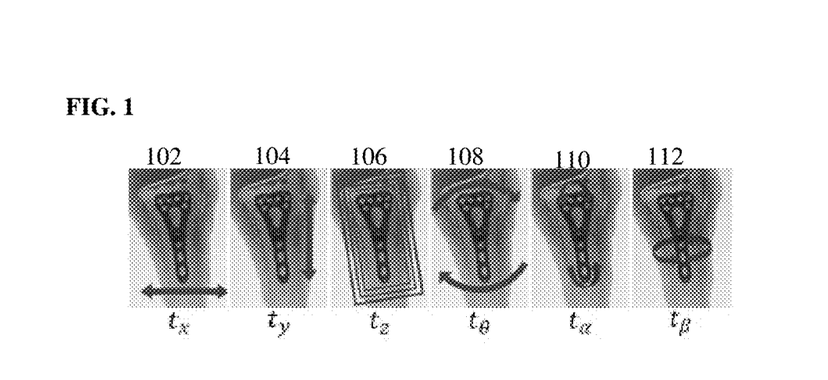
FIG. 1 illustrates effects of the six transformation parameters according to an embodiment of the present invention.

A rigid-body 3D transformation T can be parameterized by a vector t with six components. According to an advantageous embodiment, the transformation is parameterized by three in-plane transformation parameters and three out-of-plane transformation parameters. FIG. 1 illustrates effects of the six transformation parameters according to an embodiment of the present invention. As shown in, FIG. 1, the in-plane transformation parameters include two in-plane translation parameters, $t_x$ 102 and $t_y$ 104, and 1 in-plane rotation parameter $t_\theta$ 108. The effects of the in-plant transformation parameters 102, 104, and 108 are approximately 2D rigid-body transformations. The out-of-plane transformation parameters include one out-of-plane translation parameter $t_z$ 106, and two out-of-plane rotation parameters $t_\alpha$ 110 and $t_\beta$ 112. The effects of the out-of-plane translation 106 and rotations 110 and 112 are scaling and shape changes, respectively.

Figure 2:
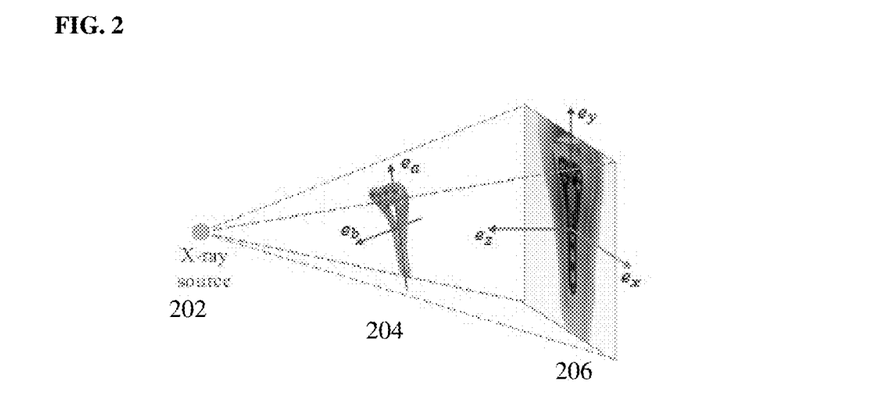
FIG. 2 illustrates an example of X-ray perspective geometry.

Mathematical definitions of the in-plane and out-of-plane parameters are given as follows. FIG. 2 illustrates an example of X-ray perspective geometry. As shown in FIG. 2, X-ray beams are transmitted from the X-ray source 202 through an object 204, resulting in an image projected onto the X-ray imaging plane 206. The horizontal axis, vertical axis, and normal direction of the X-ray imaging plane 206 are denoted as $e_x$, $e_y$, and $e_z$, respectively. The center of the X-ray imaging plane 206 is denoted as $c_p$. On the object to be registered 204, two orthogonal axes are defined, denoted as $e_a$ and $e_b$, and a reference point (preferably at the geometric center) is selected and denoted as $c_o$. The translation parameters, $t_x$, $t_y$, and $t_z$, are defined as:

$$t_x=\langle c_o-c_p, e_x\rangle,$$
$$t_y=\langle c_o-c_p, e_y\rangle,$$
$$t_z=\langle c_o-c_p, e_z\rangle,$$

The in-plane rotation parameter $t_\theta$, also referred to as "yaw", is defined as the angle between $e_y$ and the projection of $e_a$ on the imaging plane:

$$t_\theta=\angle(e_y, e_a-\langle e_a, e_y\rangle e_y).$$

The out-of-plane rotation parameter $t_\alpha$, also referred to as "pitch", is defined as the angle between $e_a$ and its projection on the imaging plane:

$$t_\alpha=\angle(e_a, e_a-\langle e_a, e_y\rangle e_y).$$

The out-of-plane rotation parameter $t_\beta$, also referred to as "roll", is defined as the angle between $e_b$ and the projection of $e_z$ on the plane perpendicular to $e_a$:

$$t_\beta=\angle(e_b, e_z-\langle e_z, e_a\rangle e_a).$$

Based on Equation (3), we denote the X-ray image with transformation parameters t as $I_t$, where the variables L and J are omitted for simplicity because they are non-varying for a given 2D/3D registration task. The inputs for the 2D/3D registration are: (1) a 3D object described by its X-ray attenuation map J; (2) an X-ray image $I_{t_{gt}}$, where $t_{gt}$ denotes the unknown ground truth transformation parameters; and (3) initial transformation parameters $t_{ini}$. The 2D/3D registration problem can be formulated as a regression problem, where a set of machine-learning based regressors $f(\cdot)$ are trained based on training data to learn a mapping from a feature $X(t_{ini}, I_{t_{gt}})$ extracted from the inputs to parameter residuals, $t_{gt}-t_{ini}$, as long as the initial transformation parameters $t_{ini}$ are within a capture range $\epsilon$ of the ground truth transformation parameters $t_{gt}$:

$$t_{gt}-t_{ini} \approx f(X(t_{ini}, I_{t_{gt}})), \forall t_{gt}-t_{ini} \in \epsilon. \quad (4)$$

An estimation of $t_{gt}$ is then obtained by applying the regressors and incorporating the estimated parameter residuals into $t_{ini}$:

$$\hat{t}_{gt}=t_{ini}+f(X(t_{ini}, I_{t_{gt}})). \quad (5)$$

It is worth noting that the range $\epsilon$ in Equation (4) is equivalent to the range of optimization-based registration methods. Based on Equation (4), the problem formulation can be expressed as designing a feature extractor $X(\cdot)$ and training regressors $f(\cdot)$, such that:

$$\delta t \approx f(X(t, I_{t+\delta t})), \forall \delta t \in \epsilon. \quad (6)$$

Embodiments of the present invention described below discuss in detail how the feature $(X(t, I_{t+\delta t}))$ is calculated and how the regressors $f(\cdot)$ are designed, trained, and applied, to achieve accurate, real-time 2D/3D medical image registration.

Figure 3:
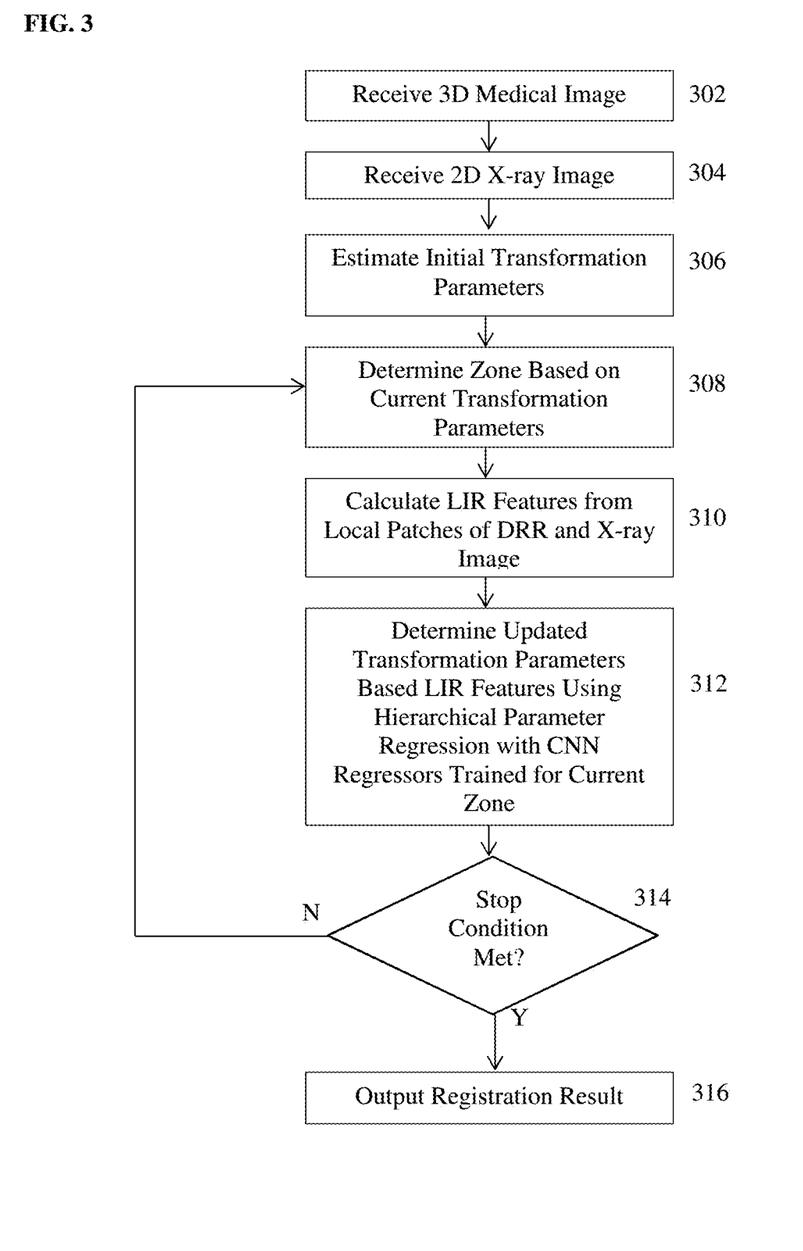
FIG. 3 illustrates a method for 2D/3D medical image registration using convolutional neural network (CNN) regression according to an embodiment of the present invention.

FIG. 3 illustrates a method for 2D/3D medical image registration using convolutional neural network (CNN) regression according to an embodiment of the present invention. The CNN regression-based 2D/3D registration method of FIG. 3 can be referred to as Pose Estimation via Hierarchical Learning (PEHL). Referring to FIG. 3, at step 302, a 3D medical image is received. In an advantageous embodiment, the 3D medical image is a 3D X-ray attenuation map. For example, the 3D medical image may be a 3D X-ray attenuation map acquired using a computed tomography (CT) or cone-beam CT (CBCT) image acquisition device. Alternatively, the 3D medical image may be a 3D X-ray attenuation map generated by converting a 3D image, such as a 3D magnetic resonance imaging (MRI) image or a 3D computer aided design (CAD) image of a medical device or other object to a 3D X-ray attenuation map. Techniques for converting such images to a 3D X-ray attenuation map are well known. In an advantageous embodiment, the 3D medical image may be a pre-operative image acquired prior to a surgical procedure. The 3D medical image may be received directly from an image acquisition device, such as a CT or CBCT image acquisition device, or may be received by loading a previously generated or stored image from a memory or storage of a computer system.

At step 304, a 2D X-ray image is received. The 2D X-ray image may be a frame in a sequence of X-ray images. In an advantageous embodiment, the 2D X-ray image may be an intra-operative X-ray image received in a sequence of X-ray images acquired during a surgical procedure to guide the surgical procedure. The X-ray image may be received directly from an X-ray image acquisition device or may be received by loading a previously acquired X-ray image from a memory or storage of a computer system. In an advantageous embodiment, the X-ray image is received from the X-ray image acquisition device in real-time as it is acquired.

At step 306, initial transformation parameters are acquired. The initial transformation parameters are estimated by generating an initial DRR from the 3D medical image based on the X-ray image. The initial DRR having the initial transformation parameters can be estimated using well-known techniques for generating a DRR to approximate a 2D X-ray image. For example, a well-understood template matching method can be used to estimate the initial transformation parameters and generate the initial DRR.

At step 308, a parameter space zone is determined based on the current transformation parameters. In an advantageous implementation, the parameter space zone is determined based on the current out-of-plane rotation transformation parameters. In the first iteration of step 308, the parameter space zone is determined based on the initial out-of-plane rotation transformation parameters. In each subsequent iteration of step 308, the parameter space zone is determined by the most recently updated out-of-plane rotation transformation parameters.

The method of FIG. 3 utilizes regressors that are trained to recover the mapping from a feature $X(t, I_{t+\delta t})$ to the transformation parameter residuals $\delta t$. Since the feature naturally depends on t, the target mapping could vary significantly as t changes, which makes it highly complex and difficult to be accurately recovered. Ideally, it would be beneficial to extract a feature that is sensitive to the parameter residuals $\delta t$, and is insensitive to the transformations parameters t. Such a feature is referred to as a pose-index feature, and the property can be expressed as:

$$X(t_1, I_{t_1+\delta t}) \approx X(t_2, I_{t_2+\delta t}) \forall (t_1, t_2). \qquad (7)$$

As discussed in greater detail below in connection with step 310, the method of FIG. 3 uses regions of interest (ROIs) to make $X(t, I_{t+\delta t})$ invariant to the in-plane and scaling parameters, $(t_x, t_y, t_z, t_\theta)$. However, we are unable to make $X(t, I_{t+\delta t})$ invariant to $t_\alpha$ and $t_\beta$ because these parameters cause complex appearance changes in the projection image. According to an embodiment of the present invention, to solve this problem, the parameter space spanned by $t_\alpha$ and $t_\beta$ is partitioned into a plurality zones. The parameter space spanned by $t_\alpha$ and $t_\beta$ is partitioned into a plurality of zones by partitioning the parameter space into a grid of a specified size, such that each square in the grid covers a particular degrees area, which is set as a zone. In an advantageous implementation, the parameter space spanned by $t_\alpha$ and $t_\beta$ is partitioned into an 18×18 grid (determined empirically by the present inventors). Each square in the grid covers a 20×20 degrees area, and is set as a separate zone. As will be discussed in greater detail in connection with step 310, for the out-of-plane rotation transformation parameters $t_\alpha$ and $t_\beta$ within each zone, the local image residual (LIR) introduced herein is approximately pose-indexed, i.e.:

$$X_k(t_1, I_{t_1+\delta t}) \approx X_k(t_2, I_{t_2+\delta t}) \forall (t_1, t_2) \in \Omega_k, \qquad (8)$$

where $X_k(\cdot, \cdot)$ denotes the LIR feature extractor for the k-th zone, and $\Omega_k$ denotes the area covered by the k-th zone. The regressors are trained separately for each zone to recover the simplified mapping that is insensitive to t.

Returning to FIG. 3, at step 310, LIR features are extracted from local patches of the DRR image and the X-ray image. The features for regression are selected separately for each zone. The feature extraction method for one zone is described herein, and the same method is applied for each zone. The LIR feature is calculated as the difference between the DRR rendered using the current transformation parameters t, denoted as $I_t$, and the X-ray image $I_{t+\delta t}$ in local patches. To determine the locations, sizes, orientations of the local patches, a number of 3D points are extracted from the 3D medical image. The 3D points correspond to 2D edges and represent the 3D model of the target object. Given a 3D point p and transformation parameters t, a square local ROI is uniquely determined in the 2D imaging plane, which can be described by a triplet, $(q, w, \phi)$, denoting the ROI's center, width, and orientation, respectively. The center q is the 2D projection of p using transformation parameters t. The width $w = w_0 \cdot D/t_z$, where $W_0$ is the size of the ROI (e.g., in mm) and D is the distance between the X-ray source and detector. The orientation $\phi = t_\theta$, so that it is always aligned with the target object. An operator $H_p^t(\cdot)$ is defined that extracts the image patch in the ROI determined by p and t, and re-samples the image patch to a fixed size (e.g., 52×52 in an exemplary implementation). Given N 3D points, $P = \{p_1, \ldots, p_N\}$, the LIR feature is then calculated as:

$$x(t, \delta t, P) = \{H_{p_i}^t(I_t) - H_{p_i}^t(I_{t+\delta t})\}_{i=1, \ldots, N}. \qquad (9)$$

In the local area of $I_t$, the effect of varying $t_\alpha$ and $t_\beta$ within a zone is approximately a 2D translation. Therefore, by extracting the local patches from ROIs selected based on t, the effects of all six translation parameters in t are compensated, making $H_p^t(I_t)$ approximately invariant to t. Since the difference between $H_p^t(I_t)$ and $H_p^t(I_{t+\delta t})$ is merely an additional 2D transformation caused by $\delta t$, $H_p^t(I_{t+\delta t})$ is also approximately invariant to t.

Figure 4:
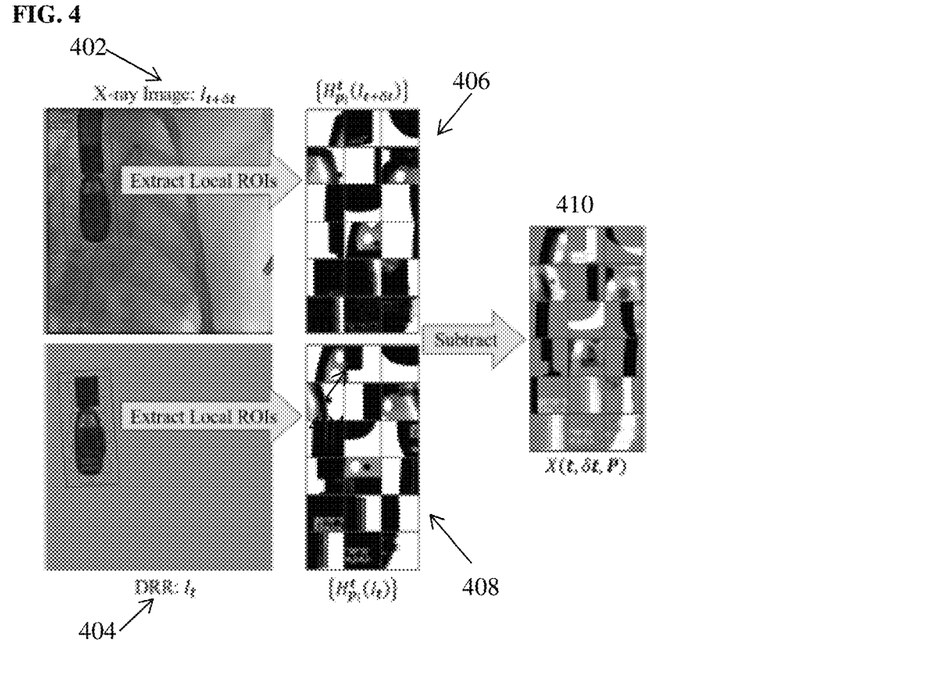
FIG. 4 illustrates a workflow for calculating local image residual (LIR) features according to an embodiment of the present invention.

FIG. 4 illustrates a workflow for calculating local image residual (LIR) features according to an embodiment of the present invention. FIG. 4 illustrates LIR feature extraction as demonstrated on X-ray Echo Fusion data. As shown in FIG. 4, image 402 is an X-ray image ($I_{t+\delta t}$) and image 404 is a DRR ($I_t$) rendered from a 3D model of a target object. Given a set 3D points P, image patches 406 ($H_p^t(I_{t+\delta t})$) and 408 ($H_p^t(I_t)$) corresponding to local ROIs determined from each 3D point $p_i$ and the transformation parameters t are extracted from the X-ray image 402 and the DRR 404, respectively. Each of the image patches 406 extracted from the X-ray image 402 is subtracted from the corresponding one of the image patches 408 extracted from the DRR 404 to calculate the set of FIR features 410 ($X(t, \delta t, P)$).

The 3D points used for calculating the FIR features are extracted separately for each zone. In an exemplary implementation, the 3D points of the 3D medical image can be calculated once for each zone prior to the surgical procedure and stored in a memory or storage of a computer system (e.g., in a database). When performing registration of the 3D medical image with X-ray images acquired in real-time, the locations of the 3D points for the current zone can then be retrieved and used to calculate the FIR features. The 3D points are extracted separately for each zone as follows.

First, 3D points that correspond to edges are extracted as candidates. Specifically, the candidates are extracted by thresholding pixels with high gradient magnitudes in a synthetic X-ray image (i.e., generated using DRR) with $t_\alpha$ and $t_\beta$ at the center of the zone, and then back-projecting them to the corresponding 3D structures. The formation model of gradients in X-ray images can be expressed as:

$$g(p) = \int \eta(L(p,r)) dr, \quad (10)$$

where g(p) is the magnitude of the X-ray image gradient at the point p, and $\eta(\cdot)$ can be computed from $\mu(\cdot)$ and the X-ray perspective geometry. p is back-projected to $L(p, r_0)$, where $$r_0 = \mathrm{argmax}_r L(p,r), \quad (11)$$

if $$\int_{r_0-\sigma}^{r_0+\sigma} \eta(L(p,r)) dr \geq 0.9 \cdot g(p) \quad (12)$$

The condition in Equation (12) ensures that the 3D structure around L(p, r) "essentially generates" the 2D gradient g(p) because the contribution of $\eta(\cdot)$ within a small neighborhood (e.g., $\sigma$=2 mm) of $L(p, r_0)$ leads to the majority (i.e., ≥90%) of the magnitude of g(p). In other words, we find the dominant 3D structure corresponding to the gradient in the X-ray image.

Once the candidates are extracted, the candidates are filtered so that only ones leading to LIR features satisfying Equation (7) and also not significantly overlapped are kept. This is achieved by randomly generating $\{t_j\}_{j=1}^M$ with $t_\alpha$ and $t_\beta$ within the zone and $\{\delta t_k\}_{k=1}^M$ within the capture range $\epsilon$ (e.g., M=1000 in an exemplary implementation. The intensity of the n-th pixel of $H_{p_i}^{t_j}(I_{t_j}) - H_{p_i}^{t_j}(I_{t_j+\delta t_k})$ is denoted as $h_{n,i,j,k}$. The following two measurements are calculated for all candidates:

$$E_i = \langle (h_{n,i,j,k} - \langle h_{n,i,j,k}\rangle j)^2 \rangle_{n,j,k}, \quad (13)$$

$$F_i = \langle (h_{n,i,j,k} - \langle h_{n,i,j,k}\rangle k)^2 \rangle_{n,j,k}, \quad (14)$$

where $\langle \cdot \rangle$ is an average operator with respect to all indexes in the subscript. Since $E_i$ and $F_i$ measure the sensitivity of $H_{p_i}^t(I_t) - H_{p_i}^t(I_{t+\delta t})$ with respect to t and $\delta t$, respectively, an ideal LIR should have a small $E_i$ to satisfy Equation (7) and a large $F_i$ for regressing $\delta t$. Therefore, the candidate list is filtered by selecting the candidate with the largest ratio: $F_i/E_i$ in the list, and then removing candidates with ROIs that have more than a certain percentage (e.g., 25%) overlapping area. This process can be repeated until the list is empty.

Returning to FIG. 3, at step 312, updated transformation parameters are determined based on the LIR features using hierarchical parameter regression with CNN regressors trained for the current zone. According to an advantageous embodiment of the present invention, instead of regressing the six transformation parameters together, which makes the mapping to be regressed extremely complex as multiple confounding factors are involved, the transformation parameters are divided into multiple groups, which are regressed hierarchically. According to an advantageous implementation, the transformation parameters are divided into the following three groups and regressed hierarchically:

Group 1: In-plane transformation parameters: $\delta t_x$, $\delta t_y$, and $\delta t_\theta$;
Group 2: Out-of-plane rotation transformation parameters: $\delta t_\alpha$ and $\delta t_\beta$;
Group 3: Out-of-plane translation transformation parameter: $\delta t_z$.

Among the three groups, the transformation parameters in Group 1 are the easiest to be estimated, because they cause simple while dominant 2D transformations of the object in the projection image that are less affected by the variations of the parameters in the other two groups. The parameter in Group 3 is the most difficult to be estimated, because it only causes subtle scaling of the object in the projection image. The difficulty in estimating parameters in Group 2 falls in between. Accordingly, the three groups of transformation parameters are regressed sequentially from the easiest group (Group 1) to the most difficult group (Group 3). After a group of parameters are regressed, the LIR feature $X(t, I_{t+\delta t})$ is re-calculated using the already estimated updated translation parameters in the regression of the next group. This way, the mapping to be regressed for each group is simplified by limiting the dimension and removing the compounding factors coming from those parameters in previous groups. The regression for each group is performed by respective regressors trained for each group for the current zone. That is, for each zone, separate regressors are hierarchically trained for each group of transformation parameters.

Figure 5:
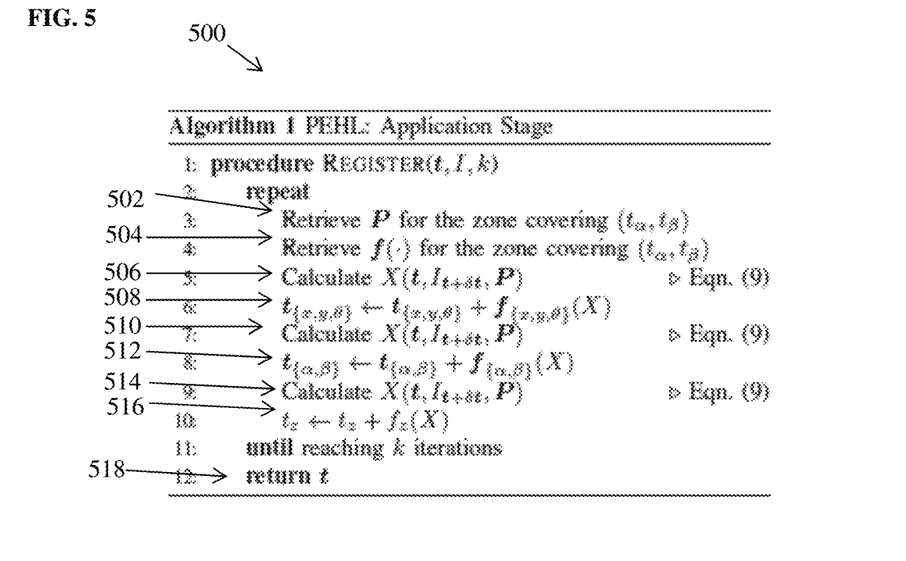
FIG. 5 illustrates an algorithm for performing pose estimation via hierarchical regression (PHEL) according to an embodiment of the present invention.

FIG. 5 illustrates an algorithm for performing pose estimation via hierarchical regression (PHEL) according to an embodiment of the present invention. The algorithm of FIG. 5 shows how steps of the method of FIG. 3 are implemented in an advantageous embodiment. As shown in FIG. 5, the algorithm 500 inputs and initial transformation parameters t, the X-ray image I, and a number of iterations k to be performed. At step 502, the set of 3D points P for the zone covering $(t_\alpha, t_\beta)$ is retrieved. At step 504, the set of trained regressors $f(\cdot)$ for the zone covering $(t_\alpha, t_\beta)$ is retrieved. The set of trained regressors $f(\cdot)$, for the current zone includes regressors trained for each group of transformation parameters for that zone. At step 506, the LIR features $X(t, \delta t, P)$ are calculated using Equation (9).

Steps 508-516 provide details regarding the implementation of step 312 of FIG. 3. At step 508, the in-plane transformation parameters $t_x$, $t_y$, and $t_\theta$ are updated using a first trained regressor $f_{\{x,y,\theta\}}$ for the current zone. The first trained regressor $f_{x,y,\theta}$ calculates values for $\delta t_x$, $\delta t_y$, and $\delta t_\theta$ based on the LIR features X, and these values are added to the previous values for the in-plane transformation parameters $t_x$, $t_y$, and $t_\theta$. At step 510, the LIR features X(t, $\delta$t, P) are re-calculated using Equation (9) with the updated values for the in-plane transformation parameters $t_x$, $t_y$, and $t_\theta$. At step 512, the out-of-plane rotation transformation parameters $t_\alpha$ and $t_\beta$ are updated using a second trained regressor $f_{\{\alpha,\beta\}}$ for the current zone. The second trained regressor $f_{\{\alpha,\beta\}}$ calculates values for $\delta t_\alpha$ and $\delta t_\beta$ based on the re-calculated LIR features X, and these values are added to the previous values for the out-of-plane rotation transformation parameters $t_\alpha$ and $t_\beta$. At step 514, the LIR features X(t, $\delta$t, P) are re-calculated using Equation (9) with the updated values for the in-plane transformation parameters $t_x$, $t_y$, $t_\theta$ and the updated values for the out-of-plane rotation transformation parameters $t_\alpha$, $t_\beta$. At step 516, the out-of-plane translation transformation parameter $t_z$ is updated using a third trained regressor $f_z$ for the current zone. The third trained regressor $f_z$ calculates a value for $\delta t_z$ based on the re-calculated LIR features X, and this value is added to the previous value for the out-of-plane translation transformation parameter $t_z$.

Steps 502-516 are repeated for k iterations, and the transformation parameters resulting from the current iterations is used as the starting position for the next iteration. The number of iterations k can be determined empirically. In an exemplary implementation, k=3 iterations can be used. At step 518, the algorithm outputs the final transformation parameters t, which provides the transformation that registers the 3D medical image to the coordinate system of the 2D X-ray image.

In the hierarchical regression approach used in step 312 of FIG. 3 and the algorithm of FIG. 5, designing the CNN regression model are two-fold: (1) the CNN regression model should be flexible enough to capture the complex mapping from X(t, δt) to δt$_x$; and (2) the CNN should be light-weighted enough to be forwarded in real-time and stored in Random Access Memory (RAM). Managing the memory footprint is important because regressors trained for all zones (324 in total) should be loaded to RAM for optimal speed. In an advantageous embodiment, the following CNN regression model is employed to address these challenges.

Figure 6:
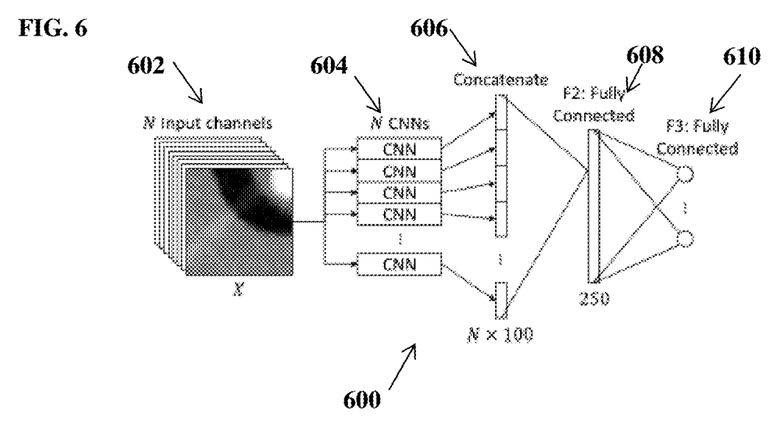
FIG. 6 illustrates the architecture of a CNN regression model trained for each group of transformation parameters in each zone according to an embodiment of the present invention.
Figure 7:
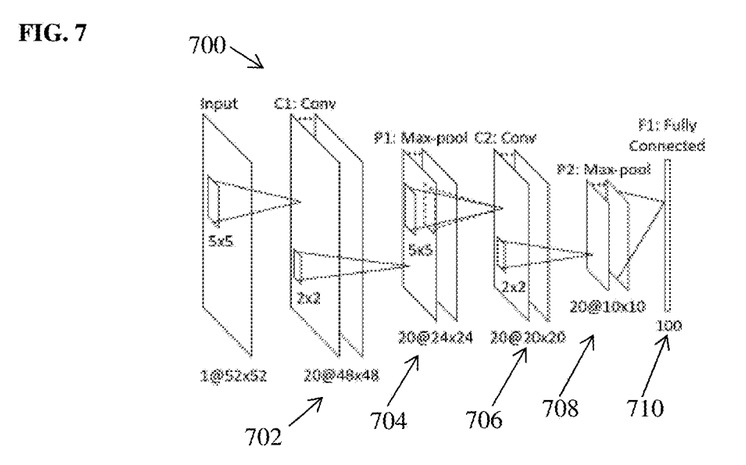
FIG. 7 illustrates a structure of the CNN applied to each input channel according to an embodiment of the present invention.

Network Structure: FIG. 6 illustrates the architecture of a CNN regression model 600 trained for each group of transformation parameters in each zone according to an embodiment of the present invention. According to Equation (9), the input of the CNN regression model 600 includes N input channels 602, corresponding to N LIR features. The CNN regression model includes N CNNs 604, and a respective one of the CNNs 604 is applied to each one of the input channels 602 for feature extraction. FIG. 7 illustrates a structure of the CNN applied to each input channel according to an embodiment of the present invention. The CNN 700 of FIG. 7 shows the structure for each of the N CNNs 604 of FIG. 6. As shown in FIG. 7, the CNN 700 includes five layers, including two 5×5 convolutional layers (C1) 702 and (C2) 706, each followed by a 2×2 max pooling layer (P1) 704 and (P2) 708 with stride 2, and a fully connected layer (F1) 710 with 100 Rectified Linear Unit (ReLU) activation neurons. Returning to FIG. 6, the feature vectors extracted by the CNNs 604 from all of the input channels 602 are then concatenated (606) and connected to another fully connected layer (F2) 608 with 250 ReLU activation neurons. The output layer (F3) 610 is fully connected to F2 608, with each output node corresponding to one translation parameter in the group. For example, the CNN regression model trained for group 1 for each zone has three output nodes, the CNN regression model trained for group 2 for each zone has two output nodes, and the CNN regression model trained for group 3 for each zone has one output node. Since the N input channels 602 have the same nature, i.e., they are LIR features at different locations, the weights in the N CNNs 604 are shared to reduce the memory footprint by N times.

In an exemplary implementation, the present inventors empirically selected the size of the ROI, which led to N≈18. In this implementation, using the CNN model 600 shown in FIG. 6 with weight sharing, there are in total 660,500 weights for each group in each zone, excluding the output layer, which only has 250×N$_t$ weights, where N$_t$ is the number of parameters in the group. If the weights are stored as 32-bit float, around 2.5 MB is required for each group in each zone. Given 3 groups and 324 zones, there are in total 972 CNN regression models and pre-loading all of them into RAM requires 2.39 GB, which is manageable for modern computers.

Training: In an advantageous implementation, the CNN regression models can be trained exclusively on synthetic X-ray images, because they provide reliable ground truth labels with little need for laborious manual annotation, and the amount of real X-ray images may be limited. In an exemplary implementation, for each group in each zone, 25,000 pairs of t and δt are generated. The parameters t follow a uniform distribution with t$_\alpha$ and t$_\beta$ constrained in the zone. The parameter errors δt also follow a uniform distribution, while three different ranges are used for the three groups, as shown in Table 1, below. The distribution ranges of δt for Group 1 are the target capture range that the regressors are designed for. The distribution ranges of δt$_x$, δt$_y$, and δt$_\theta$ are reduced for Group 2, because they are close to zero after the regressors in the first group are applied. For the same reason, the distribution in the ranges of δt$_\alpha$ and δt$_\beta$ are reduced for Group 3. For each pair of t and δt, a synthetic X-ray image $I_{t+\delta t}$ is generated and the LIR features X(t, $I_{t+\delta t}$) are calculated using Equation (9).

TABLE 1

| Group 1 | Group 2 | Group 3 |
| --- | --- | --- |
| δt$_x$~𝒰(−1.5, 1.5) | δt$_x$~𝒰(−0.2, 0.2) | δt$_x$~𝒰(−0.15, 0.15) |
| δt$_y$~𝒰(−1.5, 1.5) | δt$_y$~𝒰(−0.2, 0.2) | δt$_y$~𝒰(−0.15, 0.15) |
| δt$_z$~𝒰(−15, 15) | δt$_z$~𝒰(−15, 15) | δt$_z$~𝒰(−15, 15) |
| δt$_\theta$~𝒰(−3, 3) | δt$_\theta$~𝒰(−0.5, 0.5) | δt$_\theta$~𝒰(−0.5, 0.5) |
| δt$_\alpha$~𝒰(−15, 15) | δt$_\alpha$~𝒰(−15, 15) | δt$_\alpha$~𝒰(−0.75, 0.75) |
| δt$_\beta$~𝒰(−15, 15) | δt$_\beta$~𝒰(−15, 15) | δt$_\beta$~𝒰(−0.75, 0.75) |

The objective function to be minimized during the training is the Euclidean loss, defined as:

$$\Phi = \frac{1}{K} \sum_{i=1}^{K} \|y_i - f(X_i; W)\|_2^2, \quad (15)$$

where K is the number of training samples, $y_i$ is the label for the i-th training sample, W is a vector of weights to be learned, and $f(X_i; W)$ is the output of the regression model parameterized by W on the i-th training sample. The weights W are learned using Stochastic Gradient Descent (SGD), with a batch size of 64, momentum of m=0.9, and weight decay of d=0.0001. The update rule for W is:

$$V_{i+1} := m \cdot V_i - d \cdot \kappa_i \cdot W_i - \kappa_i \cdot \left( \frac{\partial \Phi}{\partial W} \bigg|_{W_i} \right)_{D_i}, \quad (16)$$

$$W_{i+1} := W_i + V_{i+1}, \quad (17)$$

where i is the iteration index, V is the momentum variable, $\kappa_i$ is the learning rate at the i-th iteration, and $$\left( \frac{\partial \Phi}{\partial W} \bigg|_{W_i} \right)_{D_i}$$

is the derivative of the objective function computed on the i-th batch $D_i$ with respect to W, evaluated at $W_i$. The learning rate $\kappa_i$ is decayed in each iteration following:

$$\kappa_i = 0.0025 \cdot (1 + 0.0001 \cdot i)^{-.75}. \quad (18)$$

The derivative $$\frac{\partial \Phi}{\partial W}$$

is calculated using back-propagation. For weights share in multiple paths, their derivatives in all paths are back-propagated separately and summed up for the weight update. The weights can be initialized using the Xavier method and mini-batch SGD can be performed for a number of iterations (e.g., 12,500 iterations (32 epochs)).

Returning to FIG. 3, at step 314, it is determined whether a stop condition is met. For example, the stop condition may be a predetermined number of iterations, as shown in the algorithm 500 of FIG. 5. Alternatively, the stop condition can be when the transformation parameters converge such that changes to the values of the transformation parameters in the most recent update are less than a predetermined threshold. If the stop condition is not met, the method returns to step 308, and steps 308-314 are repeated, starting with the current transformation parameters. When the stop condition is met, the method proceeds to step 316.

At step 316, the registration results are output. In particular, the final transformation parameters are output, and the transformation parameters provide a transformation that registers the 3D medical image to the coordinate system of the X-ray image. Information from the 3D medical image can then be projected or overlaid onto the X-ray image. For example, a DDR can be generated using the final transformation parameters and the DDR can be overlaid on the X-ray image to provide locations of organs or other anatomical structures that are more visible or defined in the 3D medical image than in the X-ray image. The resulting fused image can be displayed on a display device in real-time during the surgical procedure.

The method of FIG. 3 can be repeated in real-time for each X-ray image in a sequence of X-ray images. In this case, the method returns to step 304 for each X-ray image that is acquired, and in step 306, after the registration method is performed for a first X-ray image, the final transformation parameters determined for each X-ray image can be used as the initial transformation parameters for each subsequent X-ray image.

Figure 8:
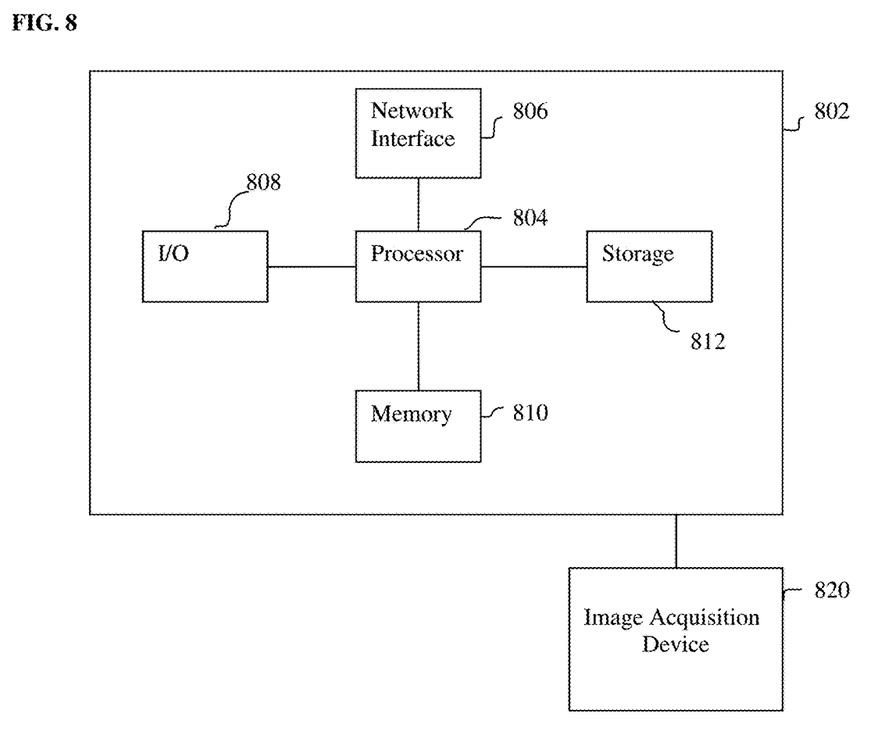
FIG. 8 is a high-level block diagram of a computer capable of implementing the present invention.

The above-described methods for 2D/3D medical image registration may be implemented on a computer using well-known computer processors, memory units, storage devices, computer software, and other components. A high-level block diagram of such a computer is illustrated in FIG. 8. Computer 802 contains a processor 804, which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, the steps of the methods of FIGS. 3 and 5 may be defined by the computer program instructions stored in the memory 810 and/or storage 812 and controlled by the processor 804 executing the computer program instructions. An image acquisition device 820, such as X-ray image acquisition device, CT image acquisition device, etc., can be connected to the computer 802 to input image data to the computer 802. It is possible to implement the image acquisition device 820 and the computer 802 as one device. It is also possible that the image acquisition device 820 and the computer 802 communicate wirelessly through a network. In a possible embodiment, the computer 802 can be located remotely with respect to the image acquisition device 820 and the method steps described herein can be performed as part of a server or cloud based service. In this case, the method steps may be performed on a single computer or distributed between multiple networked computers. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.). Such input/output devices 808 may be used in conjunction with a set of computer programs as an annotation tool to annotate volumes received from the image acquisition device 820. One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for registering a 3D medical image with a 2D X-ray image, comprising:
   determining a parameter space zone based on transformation parameters corresponding to a digitally reconstructed radiograph (DRR) generated from the 3D medical image;
   calculating local image residual (LIR) features from local patches of the DRR and the X-ray image based on a set of 3D points in the 3D medical image extracted for the determined parameter space zone; and
   calculating updated transformation parameters based on the LIR features using a hierarchical series of regressors trained for the determined parameter space zone, wherein the hierarchical series of regressors includes a plurality of regressors each of which calculates updates for a respective subset of the transformation parameters.

2. The method of claim 1, wherein the transformation parameters include two in-plane translation transformation parameters, one out-of-plane translation transformation parameter, two out-of-plane rotational transformation parameters, and one in-plane rotational transformation parameter, in particular wherein determining a parameter space zone based on transformation parameters corresponding to a digitally reconstructed radiograph (ORR) generated from the 3D medical image comprises:
   determining the parameter space zone based on the two out-of-plane rotation transformation parameters, in particular wherein a parameter space of the two out-of-plane rotation transformation parameters is partitioned into a predetermined number of parameter space zones, each covering a predetermined area of the parameter space of the two out-of-plane rotation transformation parameters.

3. The method of claim 2, wherein calculating updated transformation parameters based on the LIR features using a hierarchical series of regressors trained for the determined parameter space zone comprises:
   calculating updates for the in-plane translational transformation parameters and the in-plane rotational transformation parameter based on the LIR features using a first convolutional neural network (CNN) regressor trained for the determined parameter space zone;

re-calculating the LIR features based on the updated in-plane translational transformation parameters and in-plane rotational transformation parameter;

calculating updates for the out-of-plane rotational transformation parameters based on the LIR features using a second CNN regressor trained for the determined parameter space zone;

re-calculating the LIR features based on the updated out-of-plane rotational transformation parameters; and calculating updates for the out-of-plane translational transformation parameter based on the LIR features using a third CNN regressor trained for the determined parameter space zone.

4. The method of claim 1, wherein the hierarchical series of regressors is a hierarchical series of trained convolutional neural network (CNN) regressors.

5. The method of claim 1, wherein calculating local image residual (LIR) features from local patches of the DRR and the X-ray image based on a set of 3D points in the 3D medical image extracted for the determined parameter space zone comprises:

for each 3D point in the set of 3D points, extracting corresponding local image patches in the DRR and the X-ray image based on a 2D region of interest determined for the 3D; and calculating the LIR features by subtracting each local image patch extracted in the X-ray image from the corresponding local image patch extracted in the DRR.

6. The method of claim 1, further comprising:

repeating determining the parameter space zone, calculating the LIR features, and calculating the updated transformation parameters for a plurality of iterations or further comprising:

repeating determining a parameter space zone, calculating LIR features, and calculating updated transformation parameters for a second X-ray image, starting with the updated transformation parameters calculated to register the 3D medical image to the X-ray image as initial transformation parameters for registering the 3D medical image to the second X-ray image.

7. The method of claim 6, wherein the set of 3D points extracted for the determined parameter space zone includes 3D points corresponding to 2D edges in the DRR or further comprising:

extracting the 3D points for the determined parameter space zone by:

generating candidate 3D points in the 3D medical image for the parameter space zone by thresholding pixels in a 2D DRR centered in the parameter space zone with high gradient magnitudes and back-projecting the pixels with high gradient magnitudes to corresponding 3D structures in the 3D medical image; and filtering the candidate 3D points to select candidate 3D points with LIR feature values that are invariant to the transformation parameters but sensitive to transformation parameter residuals and remove candidate 3D points with overlapping regions of interest.

8. An apparatus for registering a 3D medical image with a 2D X-ray image, comprising:

means for determining a parameter space zone based on transformation parameters corresponding to a digitally reconstructed radiograph (DRR) generated from the 3D medical image;

means for calculating local image residual (LIR) features from local patches of the DRR and the X-ray image based on a set of 3D points in the 3D medical image extracted for the determined parameter space zone; and means for calculating updated transformation parameters based on the LIR features using a hierarchical series of regressors trained for the determined parameter space zone, wherein the hierarchical series of regressors includes a plurality of regressors each of which calculates updates for a respective subset of the transformation parameters.

9. The apparatus of claim 8, wherein the transformation parameters include two in-plane translation transformation parameters, one out-of-plane translation transformation parameter, two out-of-plane rotational transformation parameters, and one in-plane rotational transformation parameter.

10. The apparatus of claim 9, wherein the means for determining a parameter space zone based on transformation parameters corresponding to a digitally reconstructed radiograph (DRR) generated from the 3D medical image comprises:

means for determining the parameter space zone based on the two out-of-plane rotation transformation parameters.

11. The apparatus of claim 10, wherein a parameter space of the two out-of-plane rotation transformation parameters is partitioned into a predetermined number of parameter space zones, each covering a predetermined area of the parameter space of the two out-of-plane rotation transformation parameters.

12. The apparatus of claim 9, wherein the means for calculating updated transformation parameters based on the LIR features using a hierarchical series of regressors trained for the determined parameter space zone comprises:

means for calculating updates for the in-plane translational transformation parameters and the in-plane rotational transformation parameter based on the LIR features using a first convolutional neural network (CNN) regressor trained for the determined parameter space zone;

means for re-calculating the LIR features based on the updated in-plane translational transformation parameters and in-plane rotational transformation parameter;

means for calculating updates for the out-of-plane rotational transformation parameters based on the LIR features using a second CNN regressor trained for the determined parameter space zone;

means for re-calculating the LIR features based on the updated out-of-plane rotational transformation parameters; and means for calculating updates for the out-of-plane translational transformation parameter based on the LIR features using a third CNN regressor trained for the determined parameter space zone.

13. The apparatus of claim 8, wherein the hierarchical series of regressors is a hierarchical series of trained convolutional neural network (CNN) regressors.

14. The apparatus of claim 8, wherein the means for calculating local image residual (LIR) features from local patches of the DRR and the X-ray image based on a set of 3D points in the 3D medical image extracted for the determined parameter space zone comprises:

means for extracting, for each 3D point in the set of 3D points, corresponding local image patches in the DRR and the X-ray image based on a 2D region of interest determined for the 3D; and means for calculating the LIR features by subtracting each local image patch extracted in the X-ray image from the corresponding local image patch extracted in the DRR.

15. A non-transitory computer readable medium storing computer program instructions for registering a 3D medical image with a 2D X-ray image, the computer program instructions when executed by a processor cause the processor to perform operations comprising:
  determining a parameter space zone based on transformation parameters corresponding to a digitally reconstructed radiograph (DRR) generated from the 3D medical image;
  calculating local image residual (LIR) features from local patches of the DRR and the X-ray image based on a set of 3D points in the 3D medical image extracted for the determined parameter space zone; and
  calculating updated transformation parameters based on the LIR features using a hierarchical series of regressors trained for the determined parameter space zone, wherein the hierarchical series of regressors includes a plurality of regressors each of which calculates updates for a respective subset of the transformation parameters.

16. The non-transitory computer readable medium of claim 15, wherein the transformation parameters include two in-plane translation transformation parameters, one out-of-plane translation transformation parameter, two out-of-plane rotational transformation parameters, and one in-plane rotational translation transformation parameter.

17. The non-transitory computer readable medium of claim 16, wherein determining a parameter space zone based on transformation parameters corresponding to a digitally reconstructed radiograph (DRR) generated from the 3D medical image comprises:
  determining the parameter space zone based on the two out-of-plane rotation transformation parameters.

18. The non-transitory computer readable medium of claim 17, wherein a parameter space of the two out-of-plane rotation transformation parameters is partitioned into a predetermined number of parameter space zones, each covering a predetermined area of the parameter space of the two out-of-plane rotation transformation parameters.

19. The non-transitory computer readable medium of claim 16, wherein calculating updated transformation parameters based on the LIR features using a hierarchical series of regressors trained for the determined parameter space zone comprises:
  calculating updates for the in-plane translational transformation parameters and the in-plane rotational transformation parameter based on the LIR features using a first convolutional neural network (CNN) regressor trained for the determined parameter space zone;
  re-calculating the LIR features based on the updated in-plane translational transformation parameters and in-plane rotational transformation parameter;
  calculating updates for the out-of-plane rotational transformation parameters based on the LIR features using a second CNN regressor trained for the determined parameter space zone;
  re-calculating the LIR features based on the updated out-of-plane rotational transformation parameters; and
  calculating updates for the out-of-plane translational transformation parameter based on the LIR features using a third CNN regressor trained for the determined parameter space zone.

20. The non-transitory computer readable medium of claim 15, wherein the hierarchical series of regressors is a hierarchical series of trained convolutional neural network (CNN) regressors.

21. The non-transitory computer readable medium of claim 15, wherein calculating local image residual (LIR) features from local patches of the DRR and the X-ray image based on a set of 3D points in the 3D medical image extracted for the determined parameter space zone comprises:
  for each 3D point in the set of 3D points, extracting corresponding local image patches in the DRR and the X-ray image based on a 2D region of interest determined for the 3D; and
  calculating the LIR features by subtracting each local image patch extracted in the X-ray image from the corresponding local image patch extracted in the DRR.

* * * * *